(12) United States Patent
Lu et al.

(10) Patent No.: US 9,678,935 B2
(45) Date of Patent: Jun. 13, 2017

(54) FACILITATING DYNAMIC CROSS-BLOCK JOINING OF REPORTS IN AN ON-DEMAND SERVICES ENVIRONMENT

(71) Applicant: salesforce.com, inc., San Francisco, CA (US)

(72) Inventors: Jeremiah Lu, Union City, CA (US); Thomas Tobin, San Francisco, CA (US); Zuye Zheng, San Francisco, CA (US); Venkata Vepa, Sunnyvalye, CA (US); Vladislav Eroshin, Menlo Park, CA (US); Daphne Annina Kao, San Francisco, CA (US); Siddhi Mehta, San Francisco, CA (US); Arunkumaran Varadharajan, Foster City, CA (US)

(73) Assignee: salesforce.com, Inc., San Francisco, CA (US)

( * ) Notice: Subject to any disclaimer, the term of this patent is extended or adjusted under 35 U.S.C. 154(b) by 767 days.

(21) Appl. No.: 13/923,188

(22) Filed: Jun. 20, 2013

(65) Prior Publication Data

US 2014/0013218 A1    Jan. 9, 2014

Related U.S. Application Data

(60) Provisional application No. 61/669,460, filed on Jul. 9, 2012, provisional application No. 61/669,495, filed on Jul. 9, 2012.

(51) Int. Cl.
G06F 17/24    (2006.01)

(52) U.S. Cl.
CPC .................. *G06F 17/243* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

*Primary Examiner* — Asher Kells
(74) *Attorney, Agent, or Firm* — Alpine Technology Law Group LLC

(57) ABSTRACT

In accordance with embodiments, there are provided mechanisms and methods for facilitating dynamic cross-block joining of reports in an on-demand services environment in a multi-tenant environment according to one embodiment. In one embodiment and by way of example, a method includes receiving, at a server computing device, a joining request to merge a plurality of reports into a joined report, each of the plurality of reports having data including customer relationship management (CRM) data, where the request is placed at a client computing device, and merging the plurality of report into the joined report. The joined report comprises a single report representing the merged plurality of reports. The method may further include facilitating access, via a user interface at the client computing device, to the plurality of reports represented as the joined report.

20 Claims, 12 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2011/0035744 A1* | 2/2011 | Bhatia .............. G06F 17/30893 717/174 |
| 2012/0105471 A1* | 5/2012 | Ford .................. G06F 19/3487 345/619 |
| 2012/0174027 A1* | 7/2012 | Meier ................. G06Q 40/00 715/786 |

\* cited by examiner

FIG. 4B

Report
Support Calls by Priority  440

<<Go to Report List

[Run Report] [Show Details] | [Report Properties] | [Save] [Save As] [Customize] | [Delete] | Report generation complete.

| CASES Closed Cases 442 | | | CASES New Cases 444 | | | CASES Closed In-Progress 446 | |
|---|---|---|---|---|---|---|---|
| Case Number | Status | Case Owner | Case Number | Status | Case Owner | Case Number | Status | Case Owner |

Priority: Critical
(2 records) / (2 records) / (8 records)

| 00001196 | Closed | Jake Borland | 00001244 | New | Linda Steinberg | 00001217 | New | Tier 2 Queue |
| 00001258 | Closed | Jake Borland | 00001217 | New | Tier 2 Queue | 00001251 | Escalated | Jake Borland |
| | | | | | | 00001244 | New | Linda Steinberg |
| | | | | | | 00001175 | Researching | Luke Williams |
| | | | | | | 00001203 | Researching | Luke Williams |
| | | | | | | 00001182 | Escalated | Luke Williams |
| | | | | | | 00001393 | Waiting on customer | Luke Williams |
| | | | | | | 00001168 | Researching | Luke Williams |

Priority: High
(2 records) / (5 records) / (10 records)

| 00001195 | Closed | Matt Buchanan | 00001167 | New | Amy Argenta | 00001216 | New | Tier 3 Queue |
| 00001250 | Closed | Tier 1 queue | 00001188 | New | Linda Steinberg | 00001296 | Escalated | Tier 3 Queue |
| | | | 00001181 | New | Luke Williams | 00001257 | Escalated | Tier 3 Queue |
| | | | 00001202 | New | Matt Buchanan | 00001167 | New | Amy Argenta |
| | | | 00001216 | New | Tier 3 Queue | 00001202 | New | Matt Buchanan |
| | | | | | | 00001188 | New | Linda Steinberg |
| | | | | | | 00001243 | On Hold | Linda Steinberg |
| | | | | | | 00001400 | Waiting on customer | Luke Williams |
| | | | | | | 00001321 | Contacting PM | Luke Williams |
| | | | | | | 00001181 | New | Luke Williams |

Priority: Medium 450
(19 records) / (11 records) / (25 records)

| 00001361 | Closed | Luke Williams | 00001248 | New | Linda Steinberg | 00001218 | New | Tier 2 Queue |
| 00001371 | Closed | Luke Williams | 00001185 | New | Linda Steinberg | 00001214 | New | Tier 3 Queue |
| 00001362 | Closed | Luke Williams | 00001169 | New | Luke Williams | 00001165 | New | Tier 1 Queue |
| 00001363 | Closed | Luke Williams | 00001401 | New | Luke Williams | 00001164 | New | Tier 1 Queue |

FACILITATING DYNAMIC CROSS-BLOCK JOINING OF REPORTS IN AN ON-DEMAND SERVICES ENVIRONMENT

CLAIM OF PRIORITY

This application claims the benefit of and priority to U.S. Provisional Patent Application No. 61/669,460, entitled "Method and System for Cross-block Joining and Reporting" by Jeremiah Lu, et al., filed Jul. 9, 2012, and U.S. Provisional Patent Application No. 61/669,495, entitled "Method and System for Charting Reports and Queries" by Vladislav Eroshin, et al., filed Jul. 9, 2012, and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamic cross-block joining of reports in an on-demand services environment.

BACKGROUND

With increasing use of Customer Relationship Management (CRM) model for managing organizational interactions with customers, organizations have to work with and rely on a great deal of CRM data to continue to be successful in their respective fields. For example, representatives at organizations have to continuously review and manipulate CRM data to perform, organize, and promote various areas of business, such as sales, marketing, customer service, human resources, etc. However, today's reporting systems are greatly limited in forms and options of reporting they offer and often require a user (e.g., accountant, sales representative, human resource manager, system administrator, etc.) at an organization (e.g., business, company, etc.) to separately and individually deal with multiple reports in order to have multiple views or sets of data which is time-consuming, resource-consuming, and error-prone.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

FIG. 4A-4F illustrate screenshots of layouts as facilitated by dynamic cross-block joining mechanism of FIG. 1 according to one embodiment;

SUMMARY

Figure 1:
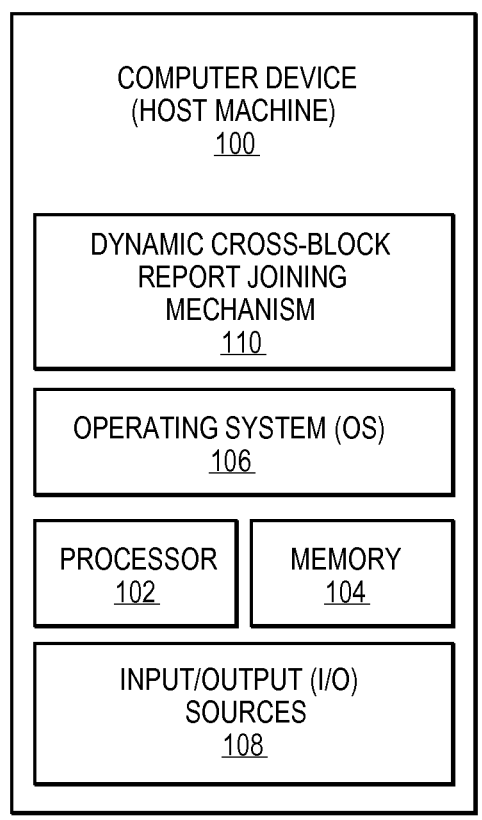
FIG. 1 illustrates a computing device employing a dynamic cross-block joining mechanism according to one embodiment.

In accordance with embodiments, there are provided mechanisms and methods for facilitating dynamic cross-block joining of reports in an on-demand services environment in a multi-tenant environment according to one embodiment. In one embodiment and by way of example, a method includes receiving, at a server computing device, a joining request to merge a plurality of reports into a joined report, each of the plurality of reports having data including customer relationship management (CRM) data, where the request is placed at a client computing device, and merging the plurality of report into the joined report. The joined report comprises a single report representing the merged plurality of reports. The method may further include facilitating access, via a user interface at the client computing device, to the plurality of reports represented as the joined report.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating dynamic cross-block joining of reports in an on-demand services environment in a multi-tenant environment according to one embodiment. In one embodiment and by way of example, a method includes receiving, at a server computing device, a joining request to merge a plurality of reports into a joined report, each of the plurality of reports having data including customer relationship management (CRM) data, where the request is placed at a client computing device, and merging the plurality of report into the joined report. The joined report comprises a single report representing the merged plurality of reports. The method may further include facilitating access, via a user interface at the client computing device, to the plurality of reports represented as the joined report.

Embodiments provide for facilitating dynamic cross-block joining of reports and in an on-demand services environment. Embodiments further provide for facilitating dynamic charting of joined reports and queries in an on-demand services environment. The dynamic cross-block joining, in one embodiment, provides for intelligent and easy filtering of data, aggregating of data, generating customer summary formula (CSF) and/or cross-block CSF and performing calculations based on CSF and cross-block CSF formulae, comparison viewing of data, flexible charting of joined reports, etc.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a computing device 100 employing a dynamic cross-block joining mechanism 110 according to one embodiment. In one embodiment, computing device 100 serves as a host machine dynamic cross-block joining mechanism ("cross-block mechanism") 110 for facilitating dynamic cross-blocking joining of reports and charting of such reports and queues in a multi-tiered, multi-tenant, on-demand services environment. The term "user" may refer to a system user, such as, but not limited to, a software/application developer, a system administrator, a database administrator, an information technology professional, a program manager, product manager, etc., or an end-user, such as a representative of a customer (e.g., an organization, a business, a company, a corporation, a non-profit entity, an institution, an agency, etc.). The term "organization" may refer to a customer or client of the provider (e.g., Salesforce.com) of cross-block mechanism 110. It is to be noted that terms like "user", "customer", "organization", "tenant", "business", "company", etc., may be used interchangeably throughout this document.

It is to be noted that any references to data, metadata, computing devices (mobile computing devices, such as smartphones, etc.), software development applications and tools (e.g., Sprint Planner®, MS Project®, Chatter® Groups, etc.), etc., discussed in this document are merely used as examples for brevity, clarity, ease of understanding, and not to obscure cross-block joining mechanism 110; however, it is contemplated that embodiments are not limited to any particular data, metadata, computing devices, software development applications and tools, etc. For example, embodiments are applicable to any number and type of applications and processes, such as CRM-based processes and applications (e.g., sales, accounting, customer support, marketing, technical support, etc.), etc.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion® Limited, now serving and trading as BlackBerry®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, cable setup boxes, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "input", "request" and "message" may be used interchangeably throughout this document. Similarly, terms "block" and "report" may be used interchangeably throughout this document.

Figure 2:
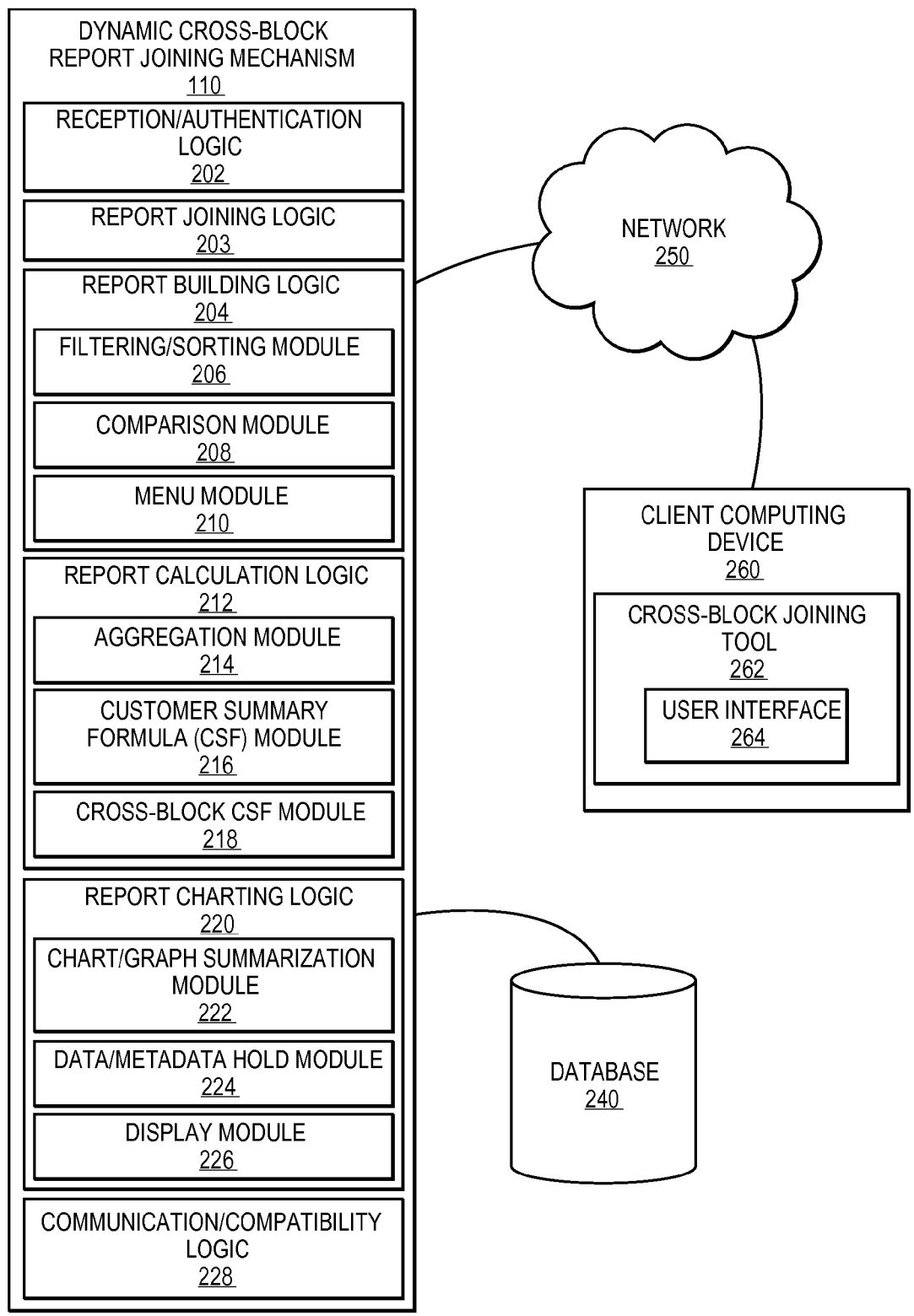
FIG. 2 illustrates a dynamic cross-block joining mechanism according to one embodiment.

FIG. 2 illustrates a dynamic cross-block joining mechanism 110 according to one embodiment. In one embodiment, cross-block mechanism 110 includes a number of components, such as: reception/authentication logic 202; report joining logic 203; report building logic 204 including filtering/sorting module 206, comparison module 208, and menu module 210; report calculation logic 212 including aggregation module 214, CSF module 216, cross-block CSF module 218; report charting logic 220 including chart/graph summarization module ("summarization module") 222, data/metadata hold/update module ("hold/update module") 224, display module 226; transmission/presentation logic 228; and communication/compatibility logic 230. Throughout this document, "logic" may be interchangeably referred to as "component" or "module" and may include, by way of example, software, hardware, and/or any combination of software and hardware, such as firmware. Further, any use of a particular word or term (e.g., cross-block, joining, customer summary formula, CSF, cross-block CSF, CRM, etc.) should not be read to limit embodiments to devices that carry that label in products or in literature external to this document.

In one embodiment, reception/authentication logic 202 may receive a request for cross-block joining of reports from a user via client computing device 260. In this case, the user may include an end-user (e.g., accountant, sales representative, finance manager, human resource director, system administrator, etc.) representing an organization (e.g., company, business, etc.) serving as a customer of service provider (e.g., Salesforce.com®, Inc.). In addition to receiving the request, reception/authentication logic 202 may also perform various authentication tasks, such as authenticating the user (e.g., using a user-identification (userID), password, name, organization unique identification, organization name, etc.), computing device 230 (e.g., public key, private key, device registration profile, etc.), the request and contents of the request (e.g., verifying the nature and content of the request, etc.), etc.

Upon reception and authentication of the request, reception/authentication logic 202 forwards the request to report joining logic 203 to perform cross-block joining of any number and type of reports into a single joined report for the user. In one embodiment, cross-block joining of reports includes joining any number and type of reports (e.g., accounting reports, sales reports, marketing reports, etc.) into a single report where the single report serves as an umbrella report while allowing the user access contents (e.g., CRM data, etc.) within each the joined reports. In one embodiment, although multiple reports may be presented as a single joined umbrella report, cross-block mechanism 110 allows the user to navigate between the multiple reports as well as access and use their contents (e.g., CRM data from various fields, columns, rows, etc.) to generate formulae, comparisons, charts, graphs, queues, forecasts, etc. It is contemplated that in some embodiments, the number and type of reports to be cross-block joined may be limited, such as having a minimum and/or a maximum number of reports to be joined, based on any number and type of factors, such as service fees an organization pays to the service provider (e.g., a higher fees may buy a higher maximum number of reports), bandwidth or system resource limitations of the service provider and/or the organization, type of reports (e.g., five accounting reports may be joined, but only three human resource reports may be joined because, for example, accounting reports tend to have more numeric data and thus may require more complex calculations, etc.), and the like.

At report building logic 204, filtering/sorting module 206 applies any filtering criteria (including, for example, any predetermined criteria previously set by the user, new criteria requested by the user, or a combination thereof) to the request to filter out any information that the user does not wish to have in the joined report. Similarly, filtering/sorting module 206 may be used to sort the data in any order (e.g., alphabetical order, priority/sensitivity level, seniority level, etc.) as requested by the user. It is contemplated that data can be filtered and/or sorted based on any number and type of factors, such as geography (e.g., geographic region, cities, countries, etc.), time period (annual, quarterly, monthly, alternate months, etc.), position or rank (e.g., managers, clerks, top management, etc.), etc. Once the data is filtered, by filtering module 206, according to predetermined and/or new criteria, the filtered reports are then forwarded on to comparison module 208.

In one embodiment, comparison module 208 facilitates dynamic comparison of contents of any number and type of reports that are provided as a single joined report to be displayed via user interface 264 at client computing device 260. For example, a side-by-side comparison of reports of the joined report may be provided to include a side-by-side visual placement of the reports so that the user may view any or all data of the reports simultaneously via user interface 264 of cross-block joining tool 262 at client computing device 260. In one embodiment, user interface 264 may be a Graphical User Interface (GUI)-like interface as illustrated with reference to FIGS. 4A-4F. In another embodiment, comparison may include content comparison where the content of two or more reports of the joined report are calculated, via report calculation logic 212, and compared, via comparison module 208, to be provided to the user at client computing device 260. It is contemplated that such comparisons of contents of the reports may be used by the user to perform a number of acts, such as forecast sales, prepare annual budgets, evaluate employee performances, determine product viability, etc.

In one embodiment, report building logic 204 further includes menu module 210 to dynamically provide new menu items (e.g., icons, dropdown menu items, buttons, etc.) through cross-block joining tool ("user tool") 262 that can be accessed by the user at client computing device 260. Menu module 210 may also be used to update, revise, and/or delete any number and type of current menu items that are provided through tool 262. It is contemplated that each menu item may be used by the user to perform any number and type of tasks (e.g., open/close/edit a report, print a report, cut and paste content, add/delete/update fields, rows, columns, etc.) relating to the joined report of multiple reports.

The user may request any number and type of calculation tasks to be performed to any contents of the joined report. For example, the user may wish to calculate various numerical aggregates relating to the contents of the joined report, such as relating to open sales cases, closed sales cases, in-progress sales cases, etc. Such aggregates may include simple calculations (e.g., addition, multiplication, subtraction, etc.), such as adding the total number of open sales opportunities from Q1 of 2013 to be compared with the total number open sales opportunities from Q1 of 2012. Such relatively simple calculations may be referred to as aggregates and are performed by aggregation module 214.

Similarly, the user may choose to request more complex calculations that may include extracting data from various data fields, columns, rows, groups, sections, etc., as well as changing the number and/or position of various data fields, columns, rows, groups, sections, etc., within a single report of several reports of the joined report. In one embodiment, the user may place such a request in any number of ways, such as by simply typing in the text, clicking on one or more icons (e.g., add, subtract, divide, etc.), dragging and dropping, etc., using tool 262 at client computing device 260.

The user request for such calculations may be included in the original user request received by reception/authentication logic 202 and automatically performed, behind the scenes, by CSF module 216. In one embodiment, CSF module 216 may be used to execute various simple and/or complex formulae (based on the user request for various calculations and aggregations) within each report of multiple reports of the joined report.

In one embodiment, cross-block CSF module 218 is used to perform the aforementioned calculations across the multiple blocks or reports. CSF module 216 may calculate data within a single report, whereas cross-block CSF module 218 may perform calculations on contents of any number of reports being represented as the joined report. For example, in response to a user request placed via user tool 262 at client computing device 260, cross-block CSF module 218 may calculate a sales representative's annual sales performance for 212 by selecting relevant data from each of four quarterly reports for 2012 that are being presented as the joined report. Cross-block CSF module 218 facilitates the ability to crossover and detect, select, and/or extract data from any number of fields, columns, rows, etc., of any number of reports of the joined report to satisfy the user request without having the user to access or open separate reports.

It is contemplated that cross-block CSF-based calculations, being performed by cross-block CSF module 218, may be relatively more complex than CSF-based calculations, being performed by CSF module 216. This is because, in one embodiment, CSF calculations may be performed using data from a single report of a joined report (although calculations may be separately performed for each report of the joined report), whereas cross-block CSF calculations may span across multiple reports of the joined report and performed using data from any number of reports of the joined report.

In one embodiment, report charting logic 220 is used for charting a graphical representation of a joined report. For example and in one embodiment, chart/graph summarization module 222 facilitates the ability to summarize data/content from computed formula fields that span across different reports being represented as the joined report. In response to a user request for graphical representation data contained within multiple reports, summarization module 222 facilitates grouping of data from any number of fields of any number of reports by choosing the relevant reports, extracting their data, and merging them back together for generating a chart/graph. Summarization module 222 may further provide the ability to compute the summarized data and to be displayed, at client computing device 260, as charts/graphs (e.g., pie chart, line graph, bar chart, etc.) using various dimensions and, for example, without having the user to place the request or run the query multiple times. For example, the user may be allowed to request or build a chart/graph, using a single query, on multiple and varying dimensions that may even be different from those of multiple reports of the joined report without having to run the query multiple times.

The computing charting data or metadata associated with each request/query may be stored or temporarily held at database 240 using hold/update module 224 such that this stored data may be reused to regenerate any previously-generated charts or graphs. This user-friendly chart/graph-generation technique is error-free as it provides that if one or more metrics or dimensions become unavailable for any reason, the unavailable dimensions or alternate metrics as well as any other changed values, default values, etc., may be automatically detected and obtained from database 240 and can be used to satisfy any subsequent charting requests placed by the user without having to issue an error in response to the user requests. Further, in one embodiment, using hold/update module 224, when any report of the joined report is edited, any relevant metadata may be accordingly and dynamically updated and similarly, when a report is just being viewed or run, the stored metadata is not updated but any runtime metadata may be dynamically updated according to the context of the viewing user.

In one embodiment, display module 226 is used to form the requested chart/graph for presentation and facilitate its display at client computing device 260 via user interface 264. Any necessary data relating to the chart/graph is then communicated, via communication/compatibility logic 228, to client computing device 260 where the requested chart/graph or any the joined report in any other form (e.g., text, list, spreadsheet, etc.) is displayed via user interface 264.

Communication/compatibility logic 228 may facilitate the ability to dynamically communicate and stay configured with any number and type of software/application developing tools, models, data processing servers, database platforms and architectures, programming languages and their corresponding platforms, etc. Communication/compatibility logic 216 further facilitates the ability to dynamically communicate and stay configured with various computing devices (e.g., mobile computing devices (such as various types of smartphones, tablet computers, laptop, etc.), networks (e.g., Internet, intranet, cloud-computing network, etc.), websites (e.g., social networking websites, such as Facebook®, LinkedIn®, Google+®, Twitter®, etc.), and the like, while ensuring compatibility with changing technologies, parameters, protocols, standards, etc.

It is contemplated that any number and type of components may be added to and/or removed from cross-block joining mechanism 110 to facilitate various embodiments including adding, removing, and/or enhancing certain features. For brevity, clarity, ease of understanding, and not to obscure cross-block joining mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3:
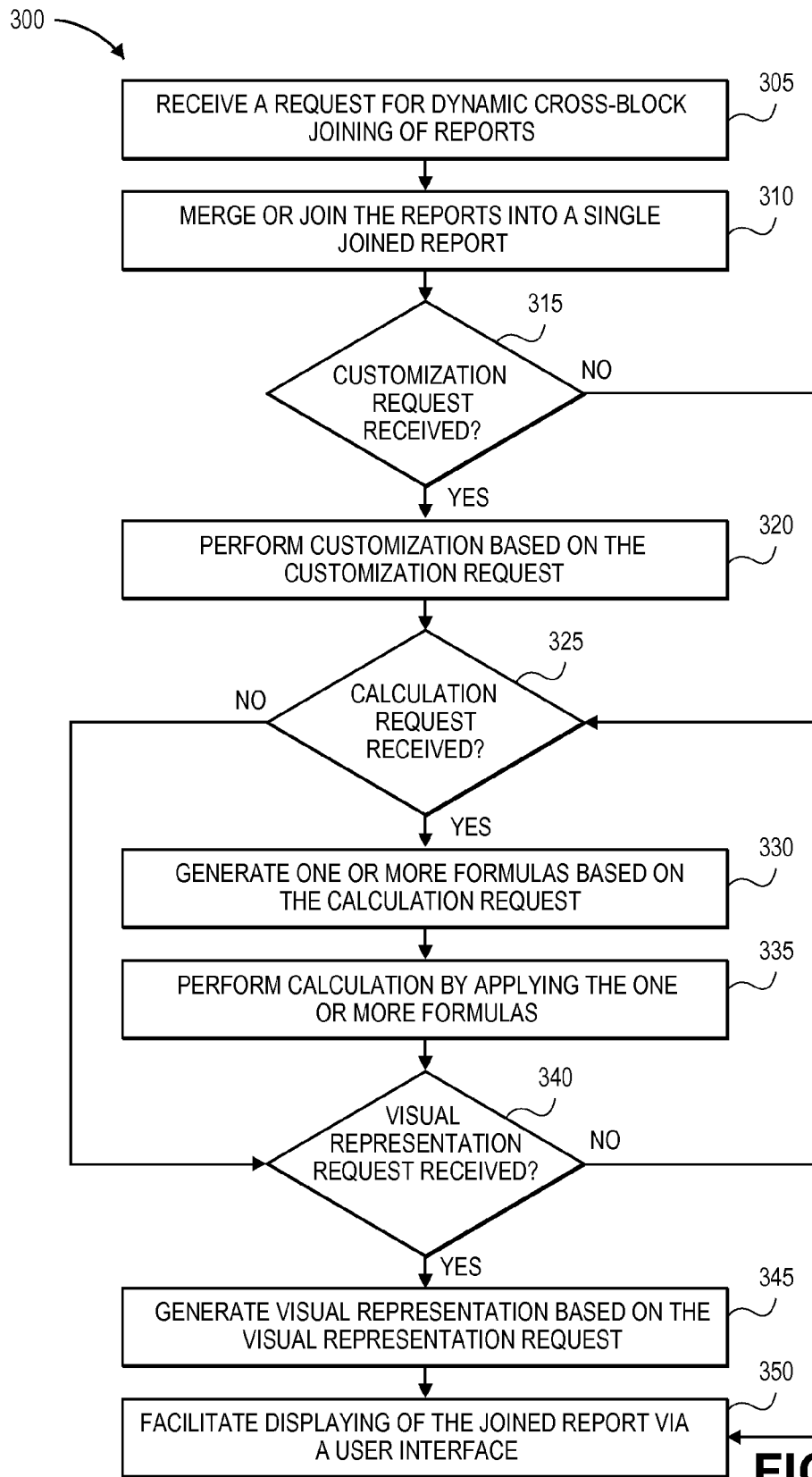
FIG. 3 illustrates a method for dynamic cross-block joining of reports in an on-demand services environment in a multi-tenant environment according to one embodiment.

FIG. 3 illustrates a method for dynamic cross-block joining of reports in an on-demand services environment in a multi-tenant environment according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by dynamic cross-block joining mechanism 110 of FIG. 1.

Method 300 begins at block 305 with receiving a request for dynamic cross-block joining of reports from a user at a client computing device. The request may be received at a server computing device hosting cross-block mechanism 110 of FIG. 1. In one embodiment, the request may include a query to join any number and type of reports (e.g., closed sales opportunities reports, open sales opportunities reports, accounting reports, human services reports, reports relating to various company products, etc.) to be provided as a single joined report. In one embodiment, the request may include other requests/queries, such as the report may further include a request for customization parameters, such as filtering parameters, sorting parameters, comparison criteria, menu items, etc., as facilitated by report building logic 204 of FIG. 2.

Similarly, the user request may further include various calculation requests, such as simple arithmetic-based aggregations, CSF calculations to be performed for one or more reports, and cross-block CSF calculations to be performed on data across multiple reports being requested as the joined report, etc., as facilitated by report calculation logic 212 of FIG. 2. The user request may further include a request for a particular visual representation of any or all of the data contained within any of the reports of the joined report, such as in the form of a chart, graph, etc., as facilitated by report charting logic 220 of FIG. 2. In another embodiment, the aforementioned requests may be placed as a single request or submitted separately and independent of the original user request for joining of reports and it is contemplated that any requests for customization, calculations, etc., may be submitted multiple times as necessitated or desired by the user. The data referenced throughout the document may include any amount and type of data and/or metadata including, but not limited to, CRM data.

At block 310, in response to the request, the requested reports are joined together as the single joined report. At block 315, a determination is made as to whether any form of customization (e.g., filtering, sorting, comparing, tools, icons, etc.) has been requested by the user. If yes, the requested customization is made at block 320. If not, the process continues at block 325 with a determination as to whether any calculations (e.g., aggregations, CSF calculations, cross-block CSF calculations, etc.) are to be performed. If yes, at block 330, one or more corresponding formulae are generated based on the calculations requested by the user. At block 335, the formulae are applied to the data contained within one or more reports and the requested calculations are performed. If no calculations are requested by the user, the process continues at block 340 without any calculations.

At block 340, a determination is made as to whether a particular visual representation (e.g., pie chart, bar graph, line graph, etc.) is requested by the user. If yes, the requested visual representation is generated at block 345. If no visual representation is requested by the user or upon generating the requested visual representation, the process continues at block 350 with facilitating displaying of the joined report via a user interface at the client computing device.

Figure 4A:
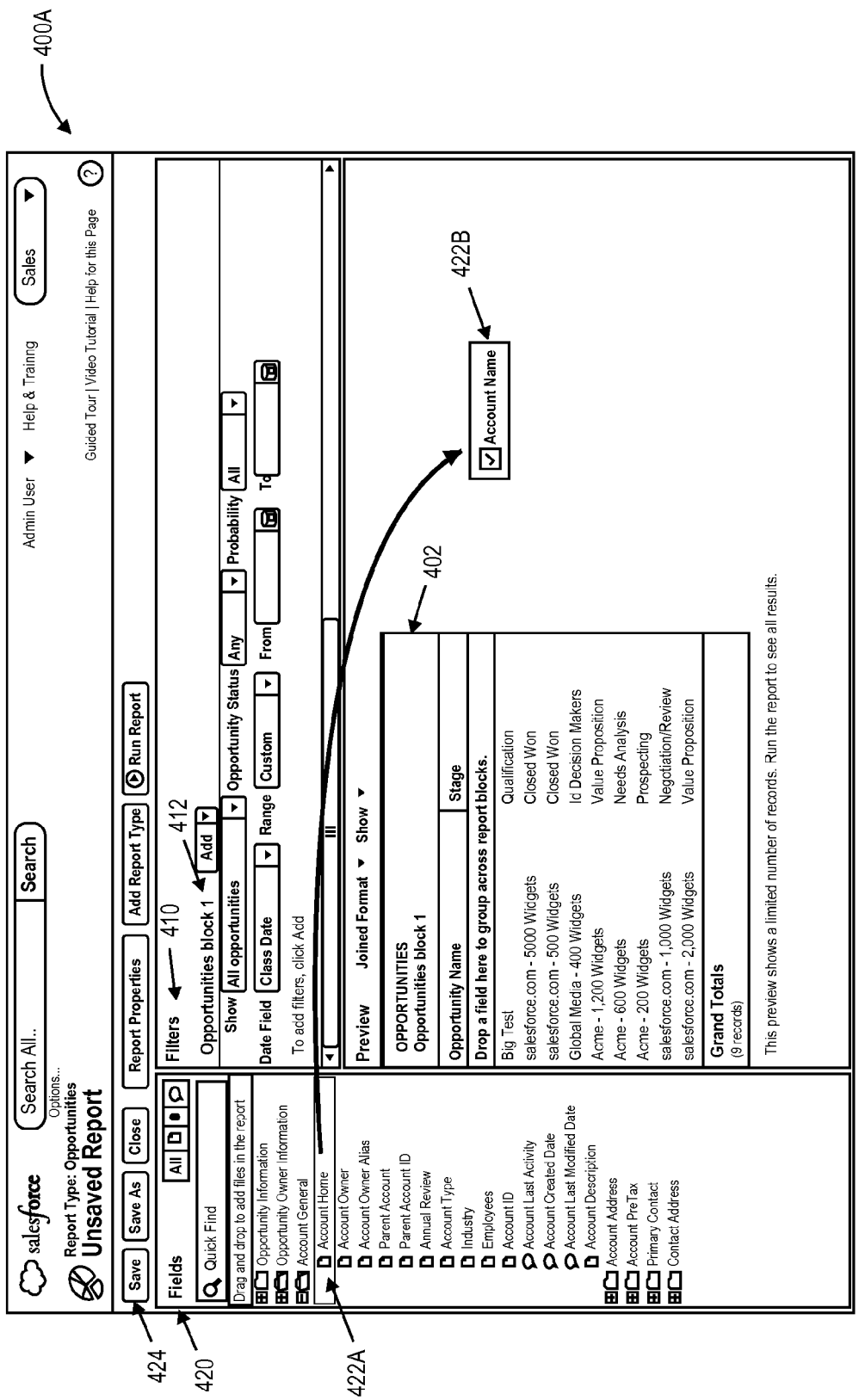
Figure 4B:
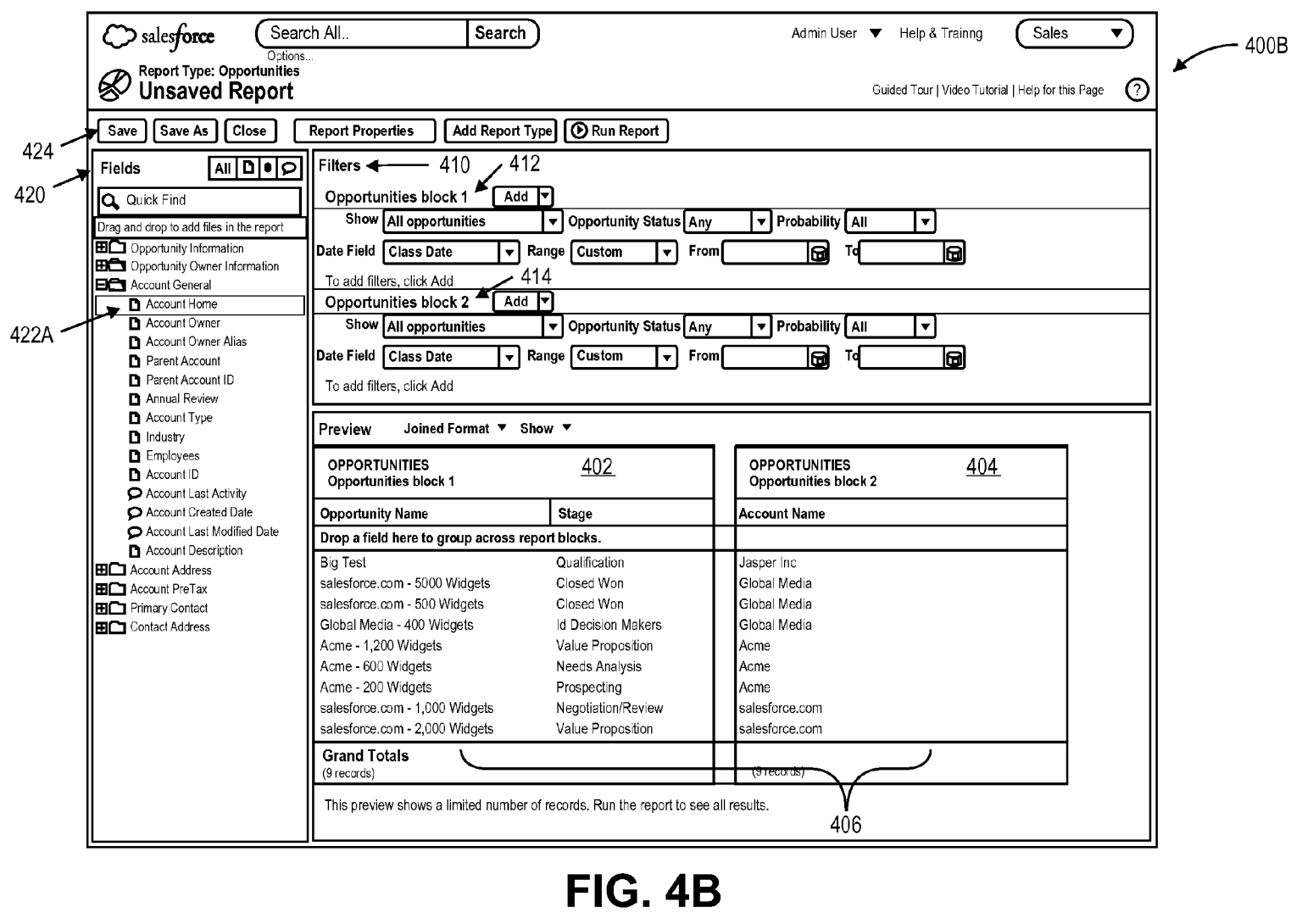

FIGS. 4A-4F illustrate screenshots of layouts 400A-400F as facilitated by dynamic cross-block joining mechanism 110 of FIG. 1 according to one embodiment. FIGS. 4A and 4B are screenshots illustrating user interface layouts 400A, 400B for creating or adding a new report 404 and forming a joined report 406 with an already existing and displayed report 402. As illustrated, the layouts 400A and 400B of FIGS. 4A-4B are GUI-like user interfaces that are provided through a cross-block joining tool, such as user interface 264 provided through cross-block joining tool 262 of FIG. 2.

In the illustrated embodiment, layout 400A of FIG. 4A shows an already-created report or block 402 containing data relating to, for example, opportunity names and stages. Layout 400A further illustrates a number of options for the user to use and manipulate to customize report 402, such as filters 410 having a list of filter options 412 entirely dedicated to the already-existing report 402. Similarly, the top portion of layouts 400A and 400B illustrates a more generic form of options 424 that are associated with and can be used by any report that is subsequently created and not just the already-created report 402. As illustrated, these top options 424 include a range of icons or buttons to perform any number and type of tasks including, but not limited to, saving a report, closing a report, reporting properties, adding a report, and running a report. The left portion of layouts 400A, 400B illustrates another set of options of fields 420 associated with any number and type of tasks relating to account name 420A, account owner, contact information, address, etc.

In one embodiment, to create a new report 404 that can then be added to the already-existing report 402, the user may simply drag account name 422A into account name 422B into the empty or blank space provided on the panel next to report 402. Upon doing so, another set of dedicated filter options 414 may appear as part of filters 410. These filter options 414 may then be used to populate the newly-generated report 404 (containing data relating to, for example, account names associated with the opportunities of report 402) which along with report 402 may be viewed and used as joined report 406 by the user at the client computing device. In one embodiment, any of reports 402 and 404 may be removed by simply choosing the option "remove block" from the dropdown menu of the corresponding filter options 412 and 414, respectively.

Figure 4C:
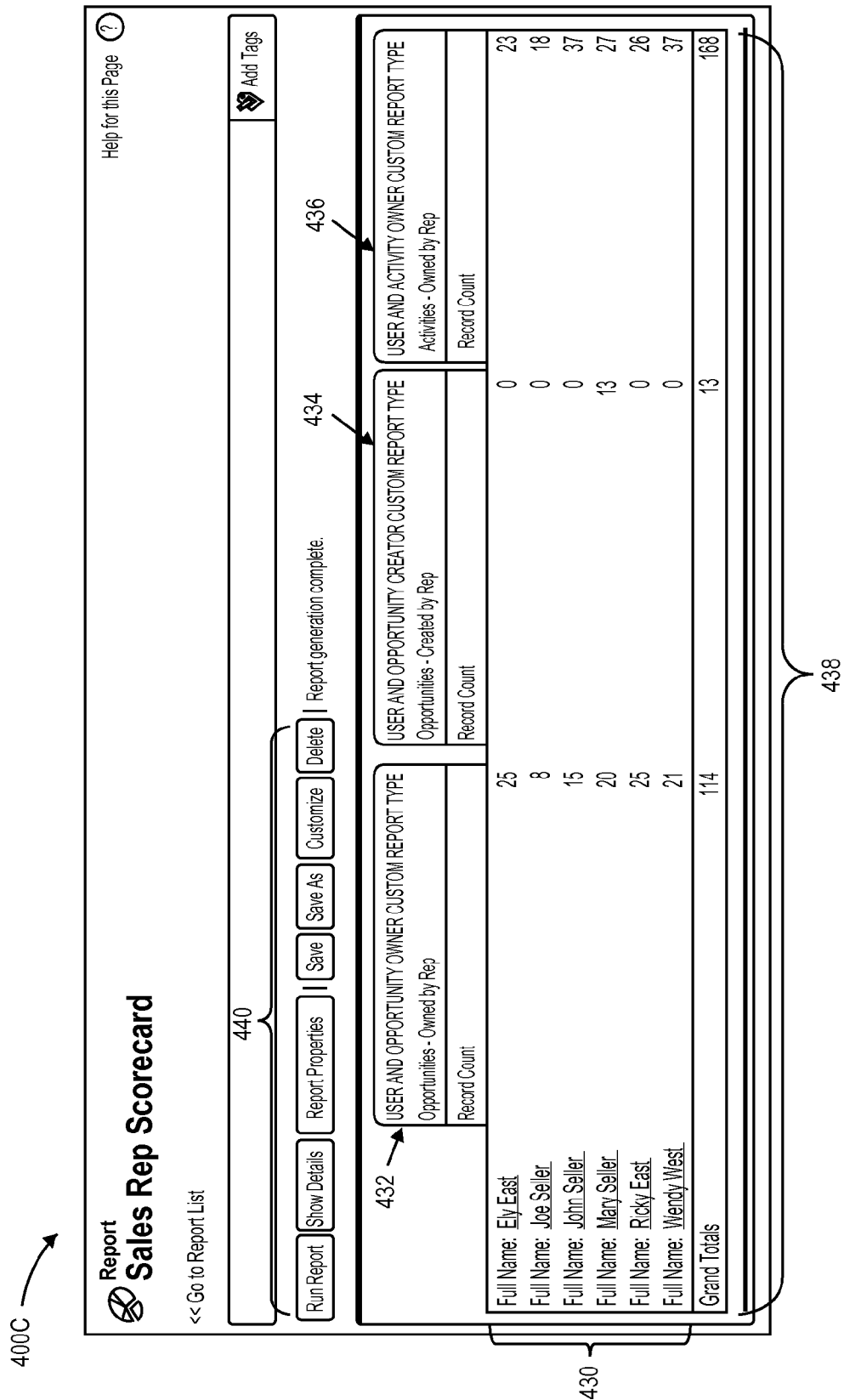

Referring now to FIG. 4C, it illustrates another screenshot representing layout 400C showing a joined report 438 having a number of reports 432, 434, 436 representing, for example, an organization's sales representative scorecard. In this example, the single joined report 438 includes three different reports 432, 434 and 436 providing sales information relating to a number of sales representatives whose names 430 are provided in report 432, but their corresponding sales data (e.g., record count) relating to opportunities, activities, etc., are seamlessly provided in all three illustrated blocks or reports 432, 434, 436 that are shown and treated as the single joined report 438. Like menu 424 of layouts 400A and 400B of FIGS. 4A and 4B, respectively, layout 400C also illustrates a top menu 440 that provides a number of options for the user to exercise, such as running a report, saving a report, deleting a report, customizing a report, etc.

Similarly, FIG. 4D illustrates layout 400D showing a joined report 448 having reports 442, 444, and 446 relating to closed cases, new cases, and cases in-progress, respectively. Each report 442-446 is shown to contain data relating to, for example, case numbers, status of cases, case owner names, etc. However, this layout 400D provides another priority-level view or breakdown 450 of the joined report 448. In other words, the user may choose to view or analyze the joined report 448, horizontally, based on the status of cases (e.g., closed, new, old) or, vertically, based on the priority level 450 (e.g., critical, high, medium) of such cases. Layout 400D includes top menu 440. It is to be noted that the option "show details" 441A of menu 440 of layout 400C of FIG. 4C is exercised here in menu 440 of layout 400D, which is showing the relevant details in reports 442-446, while the option is logically turned to recite "hide details" 441B which can now be chosen to hide the details.

Figure 4E:
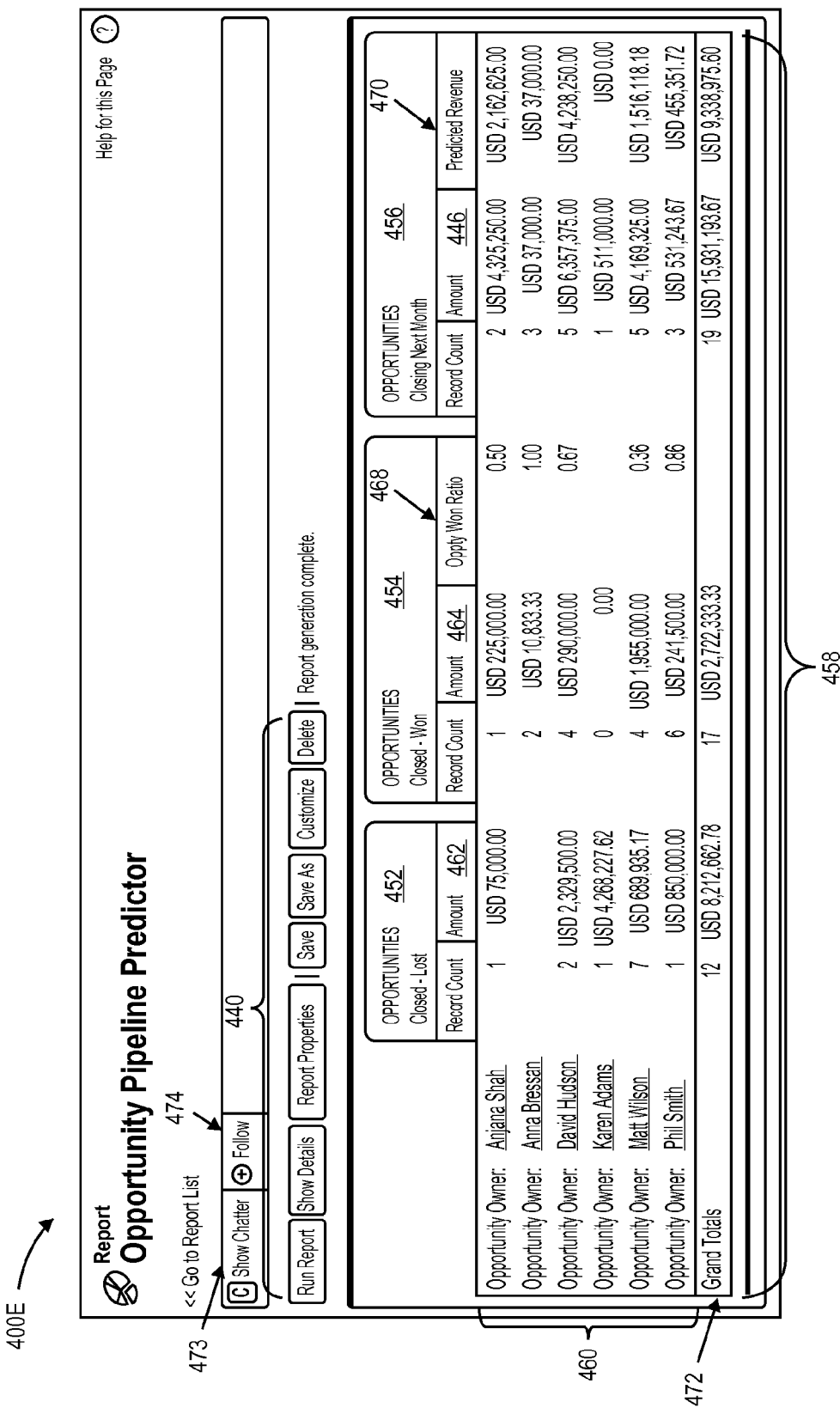

FIG. 4E illustrates a screenshot of layout 400E showing a more complex and calculated view of data of reports 452 (opportunities closed-lost), 454 (opportunities closed-won) and 456 (opportunities closing next month) being represented here as a single joined report 458. As shown in layout 400D of FIG. 4D, layout 400E needs to list the names 460 of "opportunity owners" only once while the three reports 452-456 seamlessly list the relevant data (e.g., record count, amount) associated with the opportunity owners, which further represents the three reports 452-456 as the single joined report 458. Layout 400E includes menu 440 and other options, such as chatter 473 for allowing business networking and discussion between various representatives of an organization, and follow 474 for allowing any number of representatives to follow the joined report 458.

In one embodiment, amounts 462, 464 and 466 of reports 452, 454 and 456, respectively, may be calculated locally using the data contained within each report 452-456 based on a CSF formula as calculated and applied by CSF module 216 of FIG. 2, whereas the more complex calculations that span over and use the data contained within two or more reports 452-456, such as opportunity count ratio 468 and predicted revenue 470, may be based on a more complex cross-block CSF formula as calculated and applied by cross-block CSF module 218 of FIG. 2. Grand totals 472 may be calculated using aggregation of numbers by aggregation module 214 of FIG. 2.

Figure 4F:
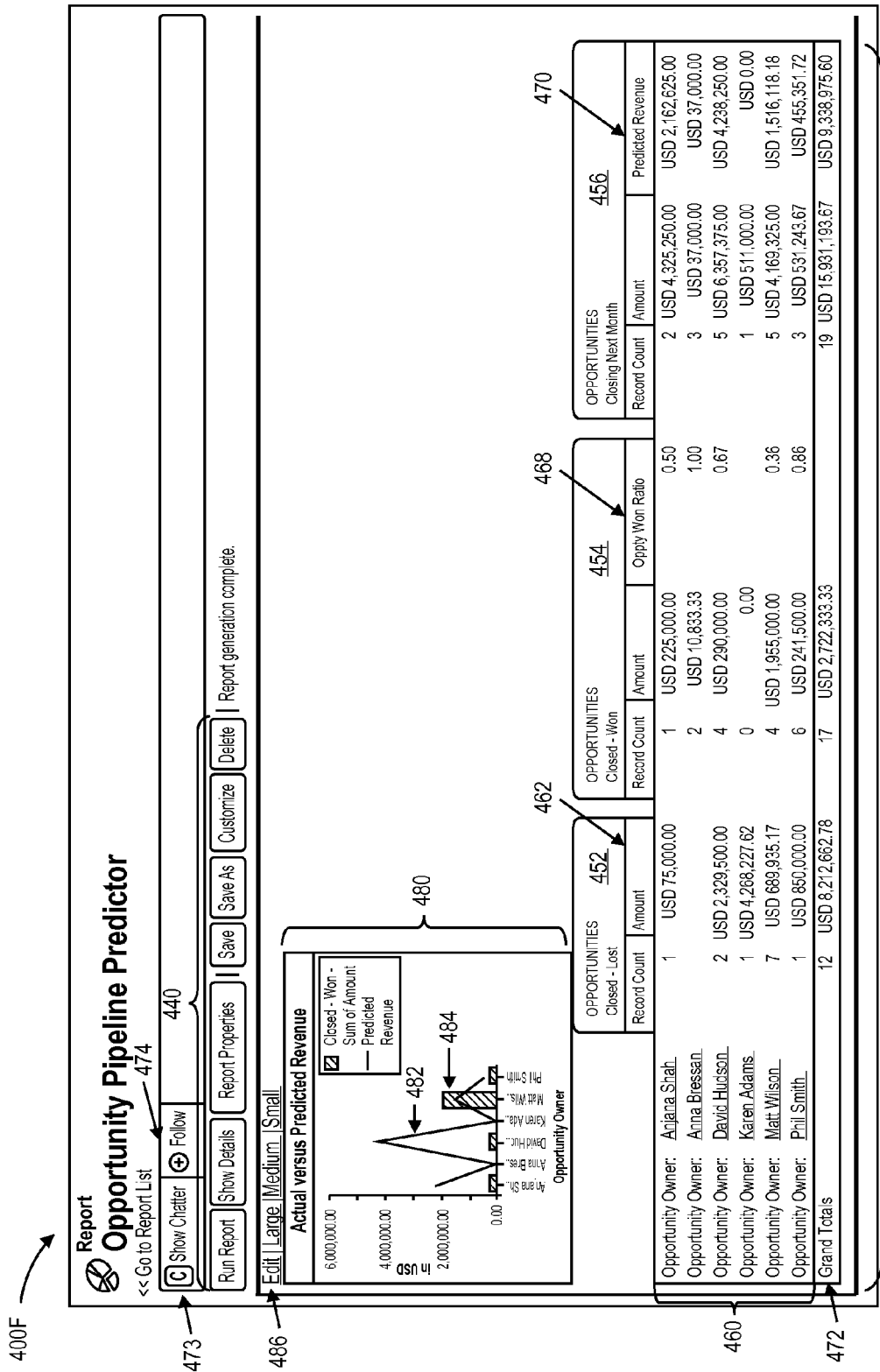

Now referring to FIG. 4F, it is a screenshot showing a layout 400F illustrating a joined report 458 including a comparison-based chart/graph 480 generated by report charting logic 220 of FIG. 2. In this illustrated embodiment, the chart/graph 480 includes a comparison of two sets of values, as compared by comparison module 208 of FIG. 2, and shown as a line graph 482 (predicted revenue) and a bar graph 482 (actual revenue). Layout 400F further provides a list of options 486 (e.g., edit, large, medium, small) to edit or manipulate the chart/graph 480 as desired or necessitated by the user. It is contemplated that embodiments are not limited to the illustrated screenshots of FIGS. 4A-4F and that their form and data are merely shown here as examples for brevity, clarity, and ease of understanding.

Figure 5:
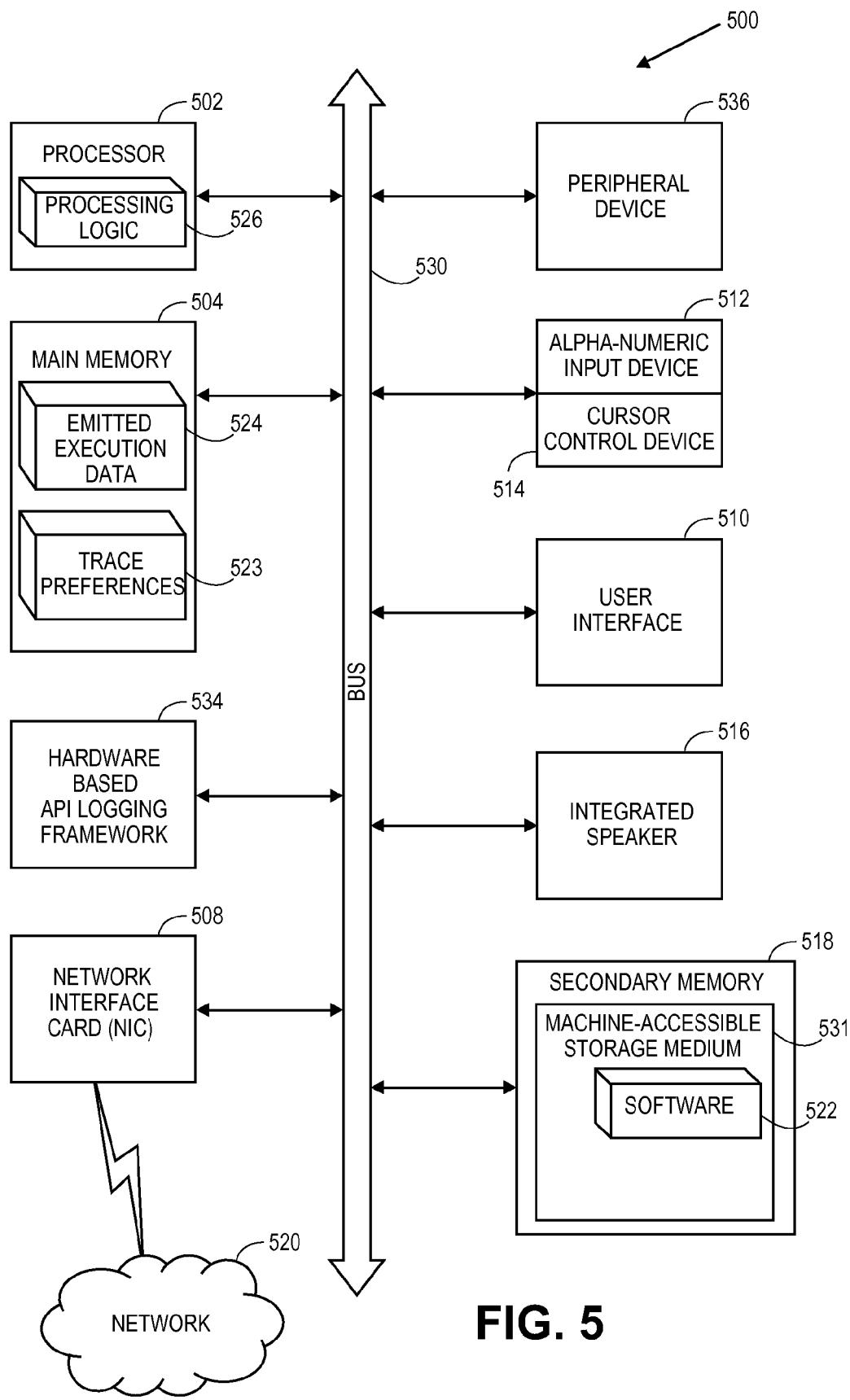
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 230 of FIG. 1 and FIG. 2, respectively. In alternative embodiments, the machine may be connected (e.g., networked) to other machines in a network (such as host machine 100 of FIG. 1 connected with client machine 230 over network 220 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of data fetching mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of data fetching mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
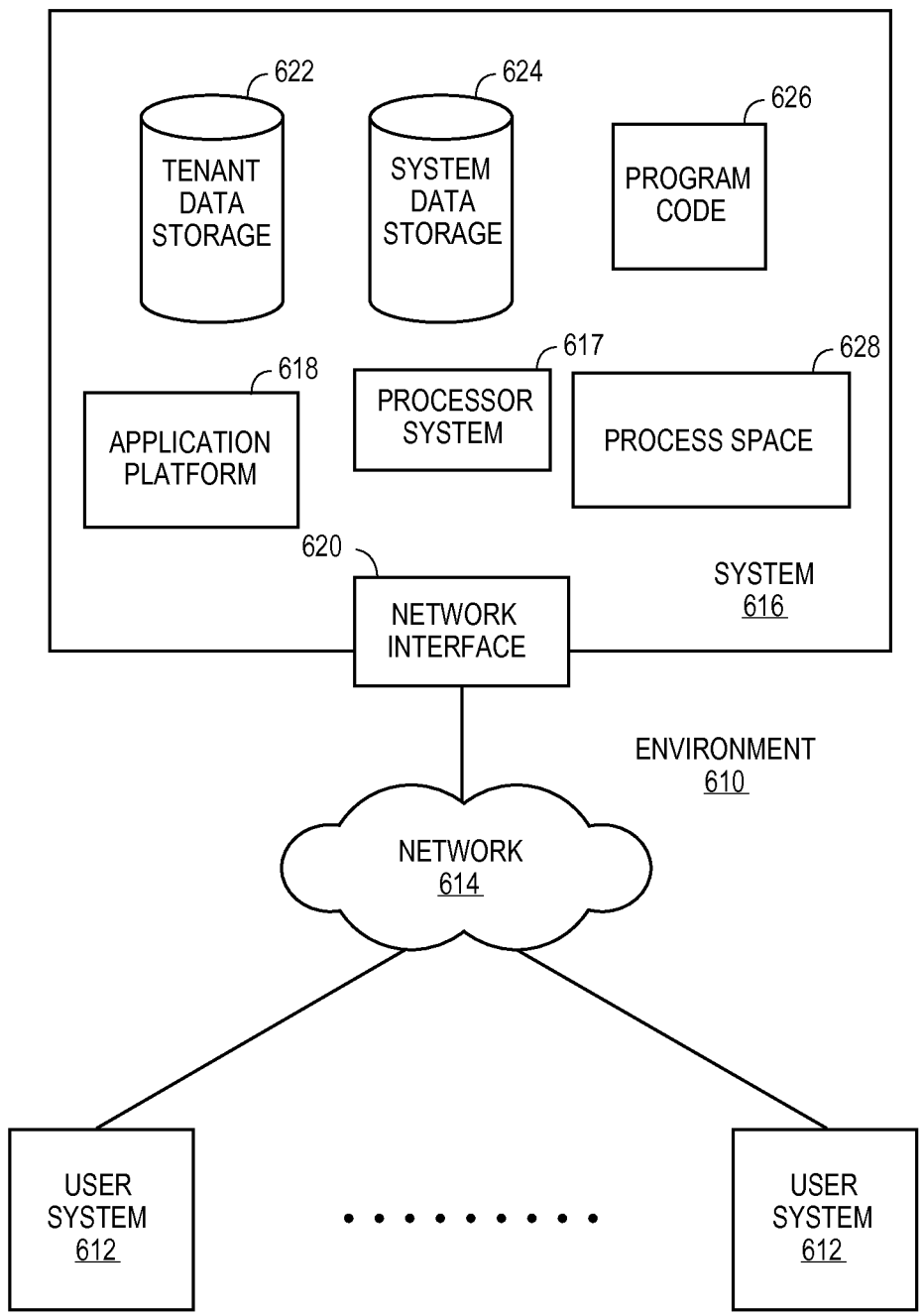
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
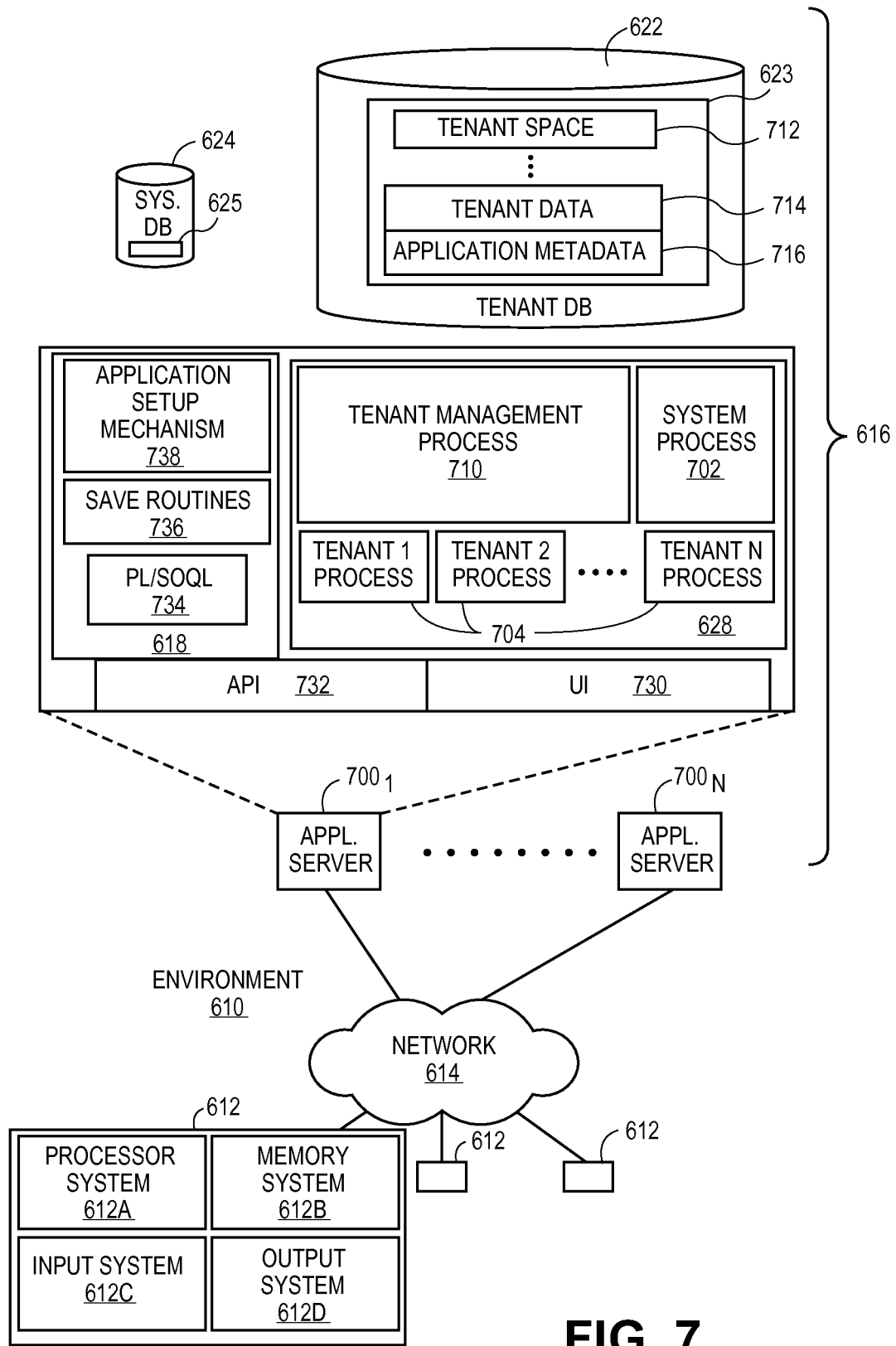
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multitenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:
    merging, by a server computing device communicatively part of a network, multiple data reports into a joined data report by aggregating multiple sets of data of the multiple data reports into an aggregated set of data;
    segmenting, by the server computing device, the aggregated set of data into multiple blocks such that each block represents a set of preferences and a portion of data transcending across the multiple sets of data, wherein the set of preferences includes one or more of formulae, display patterns, visual settings, filters, and fields;
    performing, by the server computing device, a real-time computational task relating to one or more blocks of the multiple blocks such that the computational task is performed on one or more portions of data associated with the one or more blocks in accordance with one or more sets of preferences associated with the one or more blocks; and
    facilitating, by the server computing device, access to one or more visual representations of one or more sets of results of the real-time computational task relating to the one or more blocks, wherein the one or more visual representations are offered to and accessible from a client computing device communicatively part of the network.

2. The method of claim 1, further comprising facilitating, by the server computing device, a report joining tool at the client computing device to perform at least one of customization, calculation, and visual representation relating to the joined report representing the multiple data reports, wherein the report joining tool to provide a user interface.

3. The method of claim 2, further comprising:
    receiving, by the server computing device, a customization request for customizing the joined report; and
    customizing, by the server computing device, the joined report in response to the customization request received from the user interface at the client computing device, wherein customizing includes at least one of filtering the data, sorting the data, and comparing the data, wherein customizing further includes at least one of editing or deleting one or more menu items of the report joining tool at the client computing device, and adding one or more new menu items to the report joining tool.

4. The method of claim 2, further comprising:
    receiving, by the server computing device, a calculation request for performing one or more calculations relating to the data of the joined report; and
    performing, by the server computing device, the one or more calculations relating to the data in response to the calculation request received from the user interface at the client computing device, wherein the one or more calculations include at least one of an aggregation-based calculation, a customer summary formula (CSF)-based calculation, and a cross-block CSF-based calculation.

5. The method of claim 4, wherein the CSF-based calculation is performed on a first data of the data, the first data relating to any one report of the multiple data reports of the joined report, and wherein the cross-block CSF-based calculation is performed on a second data of the data, the second data relating to any two or more reports of the multiple data reports of the joined report.

6. The method of claim 2, further comprising:
receiving, by the server computing device, a visual representation request for facilitating visual representation of the joined report at the client computing device; and
generating, by the server computing device, the visual representation of the joined report, wherein generating includes at least one of evaluating the visual representation request and preparing the visual representation based on the customization and the one or more calculations relating to one or more of the multiple data reports of the joined report.

7. The method of claim 6, further comprising facilitating, by the server computing device, a display device coupled to the client computing device to display the visual representation of the joined report.

8. A system comprising:
a server computing device communicatively part of a network, the server computing device having a memory to store instructions, and a processing device to execute the instructions to facilitate a mechanism to perform one or more operations comprising:
merging multiple data reports into a joined data report by aggregating multiple sets of data of the multiple data reports into an aggregated set of data;
segmenting the aggregated set of data into multiple blocks such that each block represents a set of preferences and a portion of data transcending across the multiple sets of data, wherein the set of preferences includes one or more of formulae, display patterns, visual settings, filters, and fields;
performing a real-time computational task relating to one or more blocks of the multiple blocks such that the computational task is performed on one or more portions of data associated with the one or more blocks in accordance with one or more sets of preferences associated with the one or more blocks; and
facilitating access to one or more visual representations of one or more sets of results of the real-time computational task relating to the one or more blocks, wherein the one or more visual representations are offered to and accessible from a client computing device communicatively part of the network.

9. The system of claim 8, wherein the one or more operations further comprise facilitating a report joining tool at the client computing device to perform at least one of customization, calculation, and visual representation relating to the joined report representing the multiple data reports, wherein the report joining tool to provide a user interface.

10. The system of claim 9, wherein the one or more operations further comprise:
receiving a customization request for customizing the joined report; and
customizing the joined report in response to the customization request received from the user interface at the client computing device, wherein customizing includes at least one of filtering the data, sorting the data, and comparing the data, wherein customizing further includes at least one of editing or deleting one or more menu items of the report joining tool at the client computing device, and adding one or more new menu items to the report joining tool.

11. The system of claim 9, wherein the one or more operations further comprise:
receiving a calculation request for performing one or more calculations relating to the data of the joined report; and
performing the one or more calculations relating to the data in response to the calculation request received from the user interface at the client computing device, wherein the one or more calculations include at least one of an aggregation-based calculation, a customer summary formula (CSF)-based calculation, and a cross-block CSF-based calculation.

12. The system of claim 11, wherein the CSF-based calculation is performed on a first data of the data, the first data relating to any one report of the multiple data reports of the joined report, and wherein the cross-block CSF-based calculation is performed on a second data of the data, the second data relating to any two or more reports of the multiple data reports of the joined report.

13. The system of claim 9, wherein the one or more operations further comprise:
receiving a visual representation request for facilitating visual representation of the joined report at the client computing device;
generating the visual representation of the joined report, wherein generating includes at least one of evaluating the visual representation request and preparing the visual representation based on the customization and the one or more calculations relating to one or more of the multiple data reports of the joined report; and
facilitating a display device coupled to the client computing device to display the visual representation of the joined report.

14. A non-transitory machine-readable medium having stored thereon instructions which, when executed by a server computing device, cause the server computing device to perform one or more operations comprising:
merging multiple data reports into a joined data report by aggregating multiple sets of data of the multiple data reports into an aggregated set of data;
segmenting the aggregated set of data into multiple blocks such that each block represents a set of preferences and a portion of data transcending across the multiple sets of data, wherein the set of preferences includes one or more of formulae, display patterns, visual settings, filters, and fields;
performing a real-time computational task relating to one or more blocks of the multiple blocks such that the computational task is performed on one or more portions of data associated with the one or more blocks in accordance with one or more sets of preferences associated with the one or more blocks; and
facilitating access to one or more visual representations of one or more sets of results of the real-time computational task relating to the one or more blocks, wherein the one or more visual representations are offered to and accessible from a client computing device communicatively part of the network.

15. The non-transitory machine-readable medium of claim 14, wherein the one or more operations further comprise facilitating a report joining tool at the client computing device to perform at least one of customization, calculation, and visual representation relating to the joined report representing the multiple data reports, the report joining tool to provide a user interface.

16. The non-transitory machine-readable medium of claim 15, wherein the one or more operations further comprise:
receiving a customization request for customizing the joined report; and
customizing the joined report in response to the customization request received from the user interface at the client computing device, wherein customizing includes at least one of filtering the data, sorting the data, and comparing the data, wherein customizing further includes at least one of editing or deleting one or more menu items of the report joining tool at the client computing device, and adding one or more new menu items to the report joining tool.

17. The non-transitory machine-readable medium of claim 15, wherein the one or more operations further comprise:
receiving a calculation request for performing one or more calculations relating to the data of the joined report; and
performing the one or more calculations relating to the data in response to the calculation request received from the user interface at the client computing device, wherein the one or more calculations include at least one of an aggregation-based calculation, a customer summary formula (CSF)-based calculation, and a cross-block CSF-based calculation.

18. The non-transitory machine-readable medium of claim 17, wherein the CSF-based calculation is performed on a first data of the data, the first data relating to any one report of the multiple data reports of the joined report, and wherein the cross-block CSF-based calculation is performed on a second data of the data, the second data relating to any two or more reports of the multiple data reports of the joined report.

19. The non-transitory machine-readable medium of claim 15, wherein the one or more operations further comprise:
receiving a visual representation request for facilitating visual representation of the joined report at the client computing device; and
generating the visual representation of the joined report, wherein generating includes at least one of evaluating the visual representation request and preparing the visual representation based on the customization and the one or more calculations relating to one or more of the multiple data reports of the joined report.

20. The non-transitory machine-readable medium of claim 19, wherein the one or more operations further comprise facilitating a display device coupled to the client computing device to display of the visual representation of the joined report.

* * * * *